Dec. 26, 1967 R. L. BAILEY 3,359,602
MOLDS FOR MANUFACTURING PLASTIC BOTTLES
Original Filed Sept. 20, 1963 4 Sheets-Sheet 1
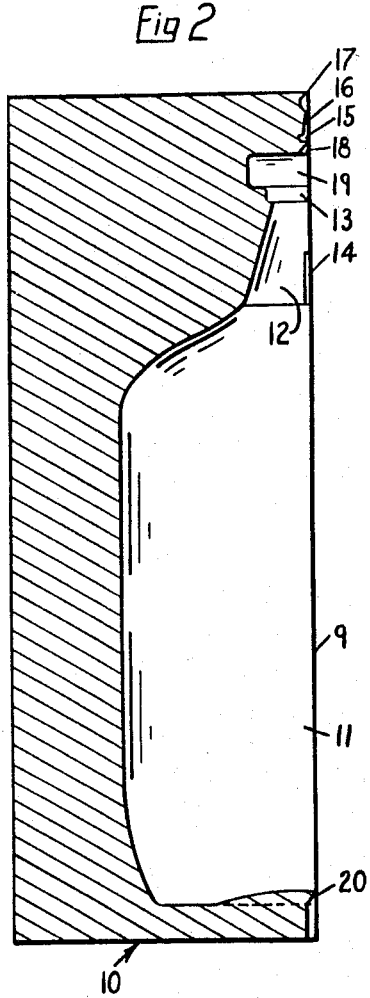
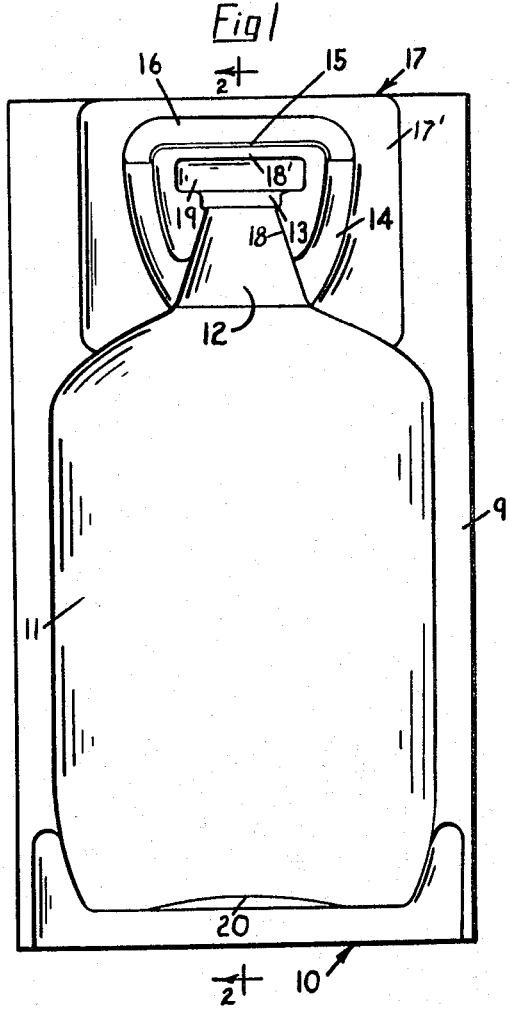
INVENTOR.
ROBERT L. BAILEY
BY
ATTYS.

Dec. 26, 1967  R. L. BAILEY  3,359,602
MOLDS FOR MANUFACTURING PLASTIC BOTTLES
Original Filed Sept. 20, 1963  4 Sheets-Sheet 2
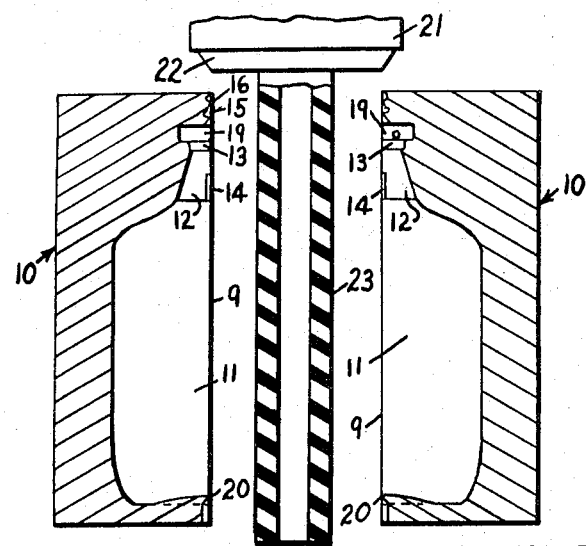
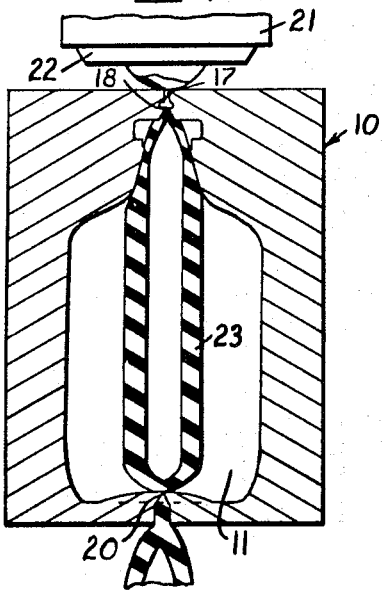
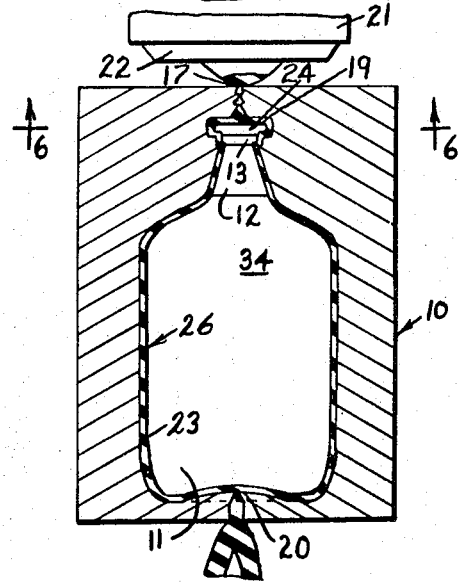
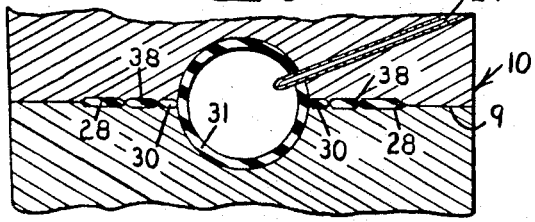
INVENTOR.
ROBERT L. BAILEY
BY
ATTYS.

Dec. 26, 1967 R. L. BAILEY 3,359,602
MOLDS FOR MANUFACTURING PLASTIC BOTTLES
Original Filed Sept. 20, 1963 4 Sheets-Sheet 3
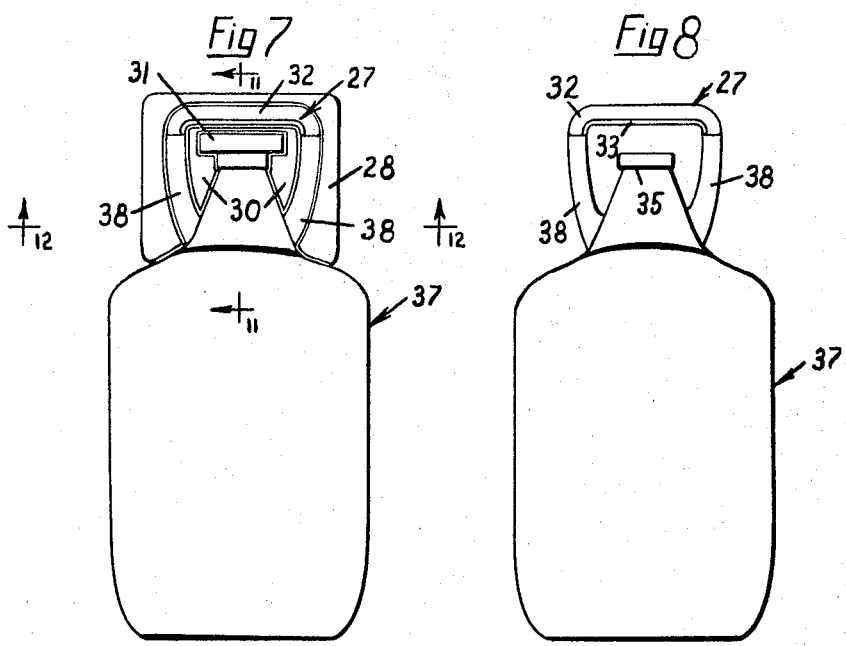
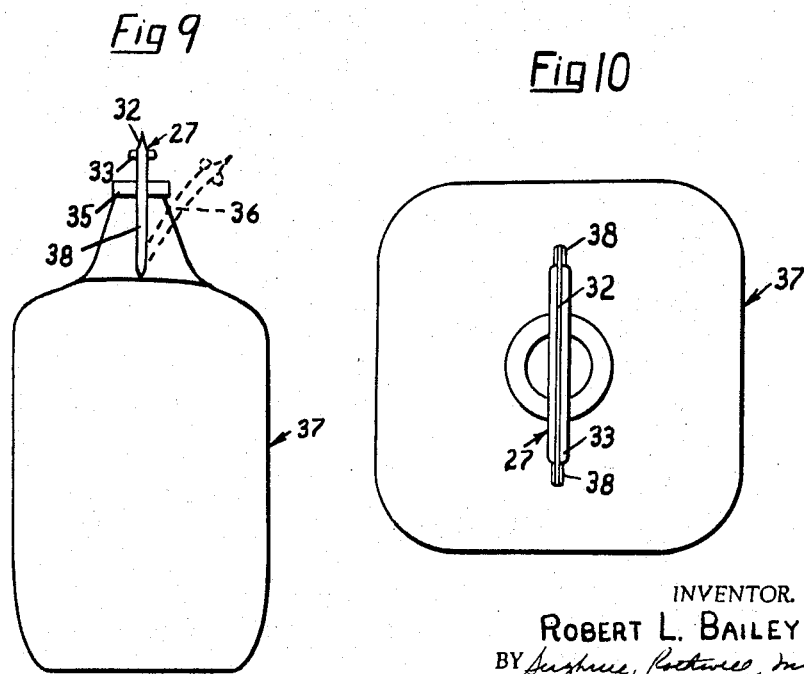
INVENTOR.
ROBERT L. BAILEY
ATTYS.

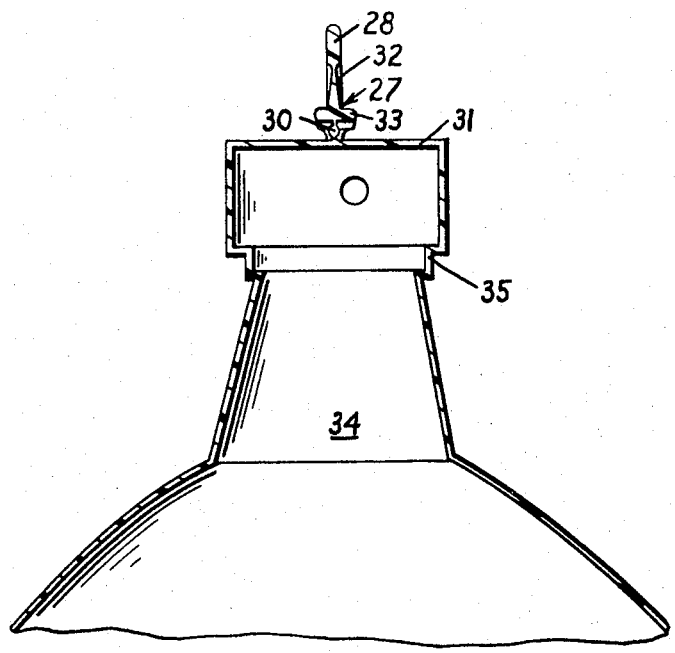
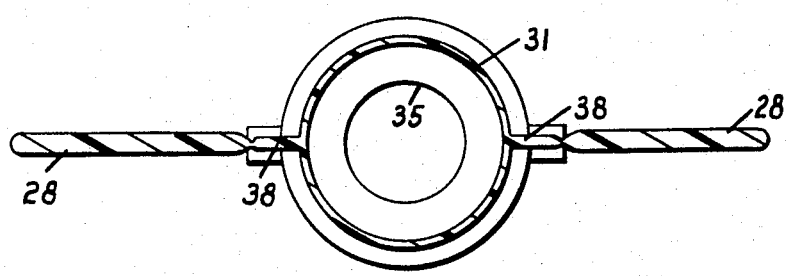

3,359,602
MOLDS FOR MANUFACTURING PLASTIC BOTTLES

Robert L. Bailey, Spokane, Wash., assignor to National Distillers & Chemical Corporation, New York, N.Y.
Original application Sept. 20, 1963, Ser. No. 310,221. Divided and this application Apr. 25, 1966, Ser. No. 544,772
2 Claims. (Cl. 18—35)

This application is a division of application Ser. No. 310,221 filed Sept. 20, 1963, now abandoned.

The present invention is concerned with molds for manufacturing plastic jugs or bottles, such as might be designed particularly for milk. The jugs or bottles produced by the mold of the present invention are provided with an integral solid handle formed over the open spout at its upper end. The handle is so shaped as to have no crevices or indentations where it joins the bottle interior, within which bacteria or dirt may be harbored. The mold for manufacturing this type of bottle deviates from known technology in molds for producing integral handles for bottles or jars by utilizing a mold which is suitable for a combination of press molding and blow molding techniques.

The present state of bottles similar to that described herein and produced by the molds in question utilizes in every known instance a removable handle of permanent or temporary material. The glass bottle commonly distributed by the dairy industry in gallon sizes requires a separable handle which must be removed during the sterilization of the bottle prior to filling. The replacement of such handles is entirely eliminated when the bottles are manufactured by means of the molds described in the present invention. In addition, the molds of this invention produces a reusable plastic bottle which will replace the glass articles now utilized. A light weight bottle is produced by the mold which is not subject to breakage and is, therefore, capable of many additional trips between the dairy and the consumer before replacement is necessary. It is recognized that molds are used for successfully producing solid handles on the sides of containers when injection molding techniques are involved. However, when a bottle is blow-molded a handle on the side of the bottle normally forms a dimple or slight recess at the joinder of the handle and the container due to the design of the prior art molds.

The mold of the present invention provides means for compression molding a handle on the top of the bottle that is subsequently blow molded thereby eliminating any recess or dimple on the interior bottle surface.

These and other features of the invention will be evident from a study of the following disclosure taken in conjunction with the accompanying drawings which illustrate a preferred form of the mold according to this invention. It is to be understood that the drawings are exemplary and are not intended to limit or restrict the invention which is set out in the claims that follow the description.

In the drawings:

FIGURE 1 is a side view looking toward the parting line of one half of a die mold utilized in the practice of this invention;

FIGURE 2 is a sectional view cut along line 2—2 in FIGURE 1;

FIGURE 3 is a diagrammatic view of the molding operation showing the extrusion of a parison between the two open dies;

FIGURE 4 is a view similar to FIGURE 3, showing the dies closed about the parison and the needle inserted in the neck of the bottle for blowing;

FIGURE 5 is a view similar to FIGURE 3, showing the blown article in the mold;

FIGURE 6 is a sectional view cut along line 6—6 in FIGURE 5 taken through the needle structure;

FIGURE 7 is a side view of the bottle as it appears when taken from the mold;

FIGURE 8 is a side view of the bottle after being trimmed of surplus plastic;

FIGURE 9 is a view taken from the side of FIGURE 8 and ilustrating an alternate position of the handle;

FIGURE 10 is an enlarged top view of the bottle shown in FIGURE 8;

FIGURE 11 is an enlarged sectional view taken along the line 11—11 in FIGURE 7; and FIGURE 12 is an enlarged sectional view on a somewhat smaller scale than FIGURE 11, cut along line 12—12 in FIGURE 7.

The present invention is designed to utilize a blow molding apparatus to produce a bottle shape including an integral handle. Generally a blow molding operation utilizes an extrusion press having an annular extrusion nozzle mounted above a two section mold. An open ended tube of plastic material, called a parison, is extended into the space separating the open die sections of the mold. The dies are then closed against the parison to pinch at least one end thereof and a blow pipe or needle is projected into the open central portion of the parison in order to admit air or gaseous material under pressure so as to press the material against the die cavity. The molded article is normally cooled in the die and, therefore, assumes a rigid shape corresponding to the die cavity.

The present invention is usable on a conventional blow molding apparatus which will not be further described in detail herein. The invention uses two identical dies in the mold. The dies are shown in detail in FIGURES 1 and 2 and are designated generally by the reference numeral 10. Basically each die includes a large body cavity 11 for the main portion of the bottle. The cavity 11 is opened to a reduced diameter neck cavity 12, topped by a shoulder cavity 13 and an excess cap cavity 19. The neck cavity area is surrounded by a handle cavity having continuous cavities 14, which are adapted to form the legs of the handle, and a cavity 15 adapted to form the flange of a cross member connected between the upper ends of the two legs of the finished bottle. Directly above the flange cavity 15 and in open communication therewith is a tapered central web cavity 16. It is to be understood that all of the cavities described above are open to one another so that an article produced therein will have a continuous integral plastic structure.

The mold is provided with three pinch-off surfaces. At the upper end of the mold is a pinch-off surface 17 which extends about the outer edge of the handle cavity, portions of the edge of the body cavity adjacent the neck cavity and along a line which is spaced outwardly from the handle cavity to define a flash cavity 17' to receive excess plastic during the closing of the dies 10 upon one another. The flash cavity 18' is bounded by the pinch-off surface 18 which is disposed along the entire inner edge of the handle cavities 14, 15 and 16, and the edges of the neck cavity 12. The pinch-off surface 18, which extends along the neck cavity 12, may be disposed entirely about the periphery of the neck cavity, but need not necessarily extend entirely about the portion of the neck cavity designated as 19 which is an excess cap cavity. The pinch-off surface 18, however, must extend along those portions of the neck cavity which correspond to the portions of the molded neck which will be retained after trimming operations. The pinch-off surfaces about the handle cavities restrict the flow of plastic into the flash cavities 17' and 18' and, therefore, tend to force the plastic along the handle cavities 14, 15 and 16 to completely fill the same. This restricted flow of plastic from the handle cavity also tends to force the plastic into the neck cavity to counteract the pressure on the plastic at that point during the blow mold operation of the bottle. At the lower end of the dies 10 are complementary pinch-off surfaces 20 which close and cut the lower end of the parison when the dies 10 are closed upon one another. Each of the sharp surfaces 17, 18 and 20 extends to the parting surface 9 of the die on which it is formed so that when the two dies are closed upon one another, as shown in FIGURE 4, the surfaces 17, 18 and 20 will pinch the plastic so as to leave only a very thin web of plastic along the lines formed thereby. These very thin webs are clearly shown in FIGURE 7 as the narrow strips between the handle and the flash material designated as 28 and 30.

The problem encountered in the practice of this invention is the provision of an integral handle structure over the normally open end of the bottle. The position of this handle makes it impossible to admit air to the parison by normal axial techniques which usually project a blow tube down the neck of the bottle. For this reason, I have developed a process whereby the handle is molded by press molding as the dies 10 are closed and whereby the bottle is blown by utilizing a needle projected from the side into the open portion of the parison which is later to be discarded. As shown in FIGURES 3 through 6, the steps of this method include the extrusion of tubular plastic material 23, known as a parison, between the open dies 10 of the mold. The parison 23 is forced from an extrusion head or nozzle 21, and through an annular orifice 22 which shapes it to the desired diameter and thickness. The parison 23 is allowed to extend completely between the open dies 10 which are then closed upon another as seen in FIGURE 4. The closing of the dies 10 results in the soft plastic material 23 being forced into the cavities 14, 15 and 16 to form a solid handle structure by press molding. At the same time, the parison 23 is pinched off at its upper and lower ends by the mating surfaces 17 and 20, respectively, and is further pinched off within the inside surfaces of the handle by means of the surfaces 18. Excess plastic is allowed to flow outwardly from the handle structure within the area bounded by upper pinch-off surfaces 17 and 18. The tapered nature of the web cavity 16 forces the plastic material upwardly and toward the center of the handle where, of course, the parison 23 is completely hollow as extruded. By properly balancing the volume of plastic material in the parison 23, one can successfully produce a completely integral handle structure within the cavities 14, 15 and 16 without any surface recess at the bottle interior.

Immediately following the closing of the dies 10, the parison 23 is pierced by a hollow needle 24 adjacent the upper closed end of the bottle. The use of side blowing techniques in blow molding operations is not new and the projection of the needle 24 may be accomplished by pneumatic means or any suitable known mechanism which will longitudinally force the needle 24 through the parison. The desired angle of the needle 24 is preferably at a radial position relative to the axis of the bottle so as to provide uniform pressure in the mold at all portions thereof. Although slight non-uniformity might exist in the excess cavity 19, which is pierced by the needle 24, this in itself is immaterial since this portion of the bottle is discarded during the trimming operations described below.

When finally blown through the needle 24, the bottle will completely fill the mold as shown in FIGURE 5 and will be ejected as a raw product shown in FIGURE 7. This bottle as taken from the mold is designated by the numeral 26. The bottle has an integral handle 27 and an exterior web 28 formed of excess plastic from the handle structure 27. There is also an interior web 30 between the handle 27 and the bottle 26. In addition, an excess cap structure 31 is provided at the upper closed end of the blown bottle 26. The details of this structure can be better seen in the enlarged sectional views of FIGURE 11 and FIGURE 12.

The bottle is finished by simple trimming operations whereby the webs 28 and 30 and the excess cap structure 31 are cut from the desired bottle structure, leaving the bottle as shown in FIGURE 8.

As shown in FIGURES 8, 9 and 10, the finished bottle preferably has a rectangular body structure generally designated as 37. However, it is to be understood that the bottle could be circular or could have another desired cross section. The present invention is primarily concerned with the production of the integral handle structure which includes the central tapered web 32 and flange 33 mounted across the legs 38 which extends upwardly and outwardly from the neck of the bottle 37. The flange 33 provides a suitable carrying surface so that a person holding the bottle 37 by the handle will have a comfortable flat surface bearing against his hand.

It is important to note in FIGURE 11 that the inside surface of the bottle designated as 34 is completely smooth and is not interrupted by the handle structure, as is the case with bottles having blown handles. The bottle is provided with a suitable shoulder 35 for the reception of a milk cap but might also be provided with screw threads if a cap screwed on the bottle 37 is desired. The particular neck shape of the bottle illustrated is also exemplary. The handle structure and the process of forming the handle are equally applicable to wide mouth and narrow mouth bottles.

It is contemplated that as a final finishing operation the handle 27 will be heated sufficiently to bend it to an offset position designated as 36 in FIGURE 9, so as to facilitate filling of the bottle 37. However, under the weight of a filled bottle the handle 27 will normally assume a vertical position as shown throughout the remainder of the drawings.

Thus I have described a novel mold for producing plastic bottles having integral solid handles formed above the openings thereof. The wide use of plastic bottles made of polyethylene and other plastic materials makes such a bottle highly desirable in many industries, particularly in the dairy industry. It is to be understood that the basic mold design of this invention may be modified to produce bottles having many different shapes in the body of the bottle, in the neck of the bottle, and in the opening of the bottle. The invention is particularly concerned with the provisions of a mold capable of producing an integral press molded handle over a bottle opening. While only a single mold has been described in detail, the invention is not to be limited to a particular description except as such limitations appear in the following claims.

Having thus described my invention, I claim:

1. A mold for manufacturing hollow plastic containers having a solid integral handle thereon extending over the opening of the container, comprising a pair of complementary dies each having a planar parting surface with a container cavity having a body portion and a reduced neck portion recessed therein for molding substantially half of the container, a handle cavity extending completely over said reduced neck portion recessed into said parting surface adjacent to and in communication with said reduced neck portion of said container cavity on opposite sides of said neck portion, flash cavity means recessed into said parting surface and surrounding said handle cavity except where said handle cavity communicates with the neck portion of said container cavity, pinch-off surface means comprised of a relatively narrow ridge defining the boundary between said handle cavity and said flash cavity means with the upper surface of said ridge disposed in the plane of said parting surface whereby said complementary dies are adapted to compressively mold a solid handle when closed upon a hollow parison of soft plastic material disposed therebetween while said pinch-off surface means restrict the flow of material from the handle cavity into said flash cavity means tending to force the plastic out of said handle cavity into said container cavity to prevent a depression or hollow from being blown into said handle cavity during blow molding of said container, said flash cavity means and said handle cavity being so dimensioned relative to the volume of the parison of soft plastic material so that said flash cavity means will be substantially filled without overflowing while said pinch-off surface means restrict the flow of material tending to force the plastic out of the handle cavity into said container cavity.

2. A mold for manufacturing hollow plastic containers as set forth in claim 1 wherein a portion of said handle cavity is provided with a relatively deep flange cavity and a tapered surface extending from the parting surface to the bottom of said flange cavity which tends to force the plastic material into said flange cavity to completely fill the flange cavity.

References Cited

UNITED STATES PATENTS 3,159,697  12/1964  Tocci _____ 18—5

FOREIGN PATENTS 752,637  7/1956  Great Britain.

WILBUR L. McBAY, *Primary Examiner.*

J. SPENCER OVERHOLSER, *Examiner.*